United States Patent
Nguyen et al.

US006892813B2

(10) Patent No.: US 6,892,813 B2
(45) Date of Patent: May 17, 2005

(54) METHODS FOR PREVENTING FRACTURE PROPPANT FLOWBACK

(75) Inventors: Philip D. Nguyen, Duncan, OK (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 205 days.

(21) Appl. No.: 10/354,404

(22) Filed: Jan. 30, 2003

(65) Prior Publication Data

US 2004/0149441 A1 Aug. 5, 2004

(51) Int. Cl.[7] .................................................. E21B 43/02
(52) U.S. Cl. ........................ 166/276; 166/280; 166/295; 166/281; 507/924
(58) Field of Search ............................... 166/276, 280, 166/281, 295, 300; 507/924

(56) References Cited

U.S. PATENT DOCUMENTS

| | | | |
|---|---|---|---|
| 3,815,680 A | * 6/1974 | McGuire et al. | ............. 166/281 |
| 5,775,425 A | 7/1998 | Weaver et al. | ............... 166/276 |
| 5,839,510 A | * 11/1998 | Weaver et al. | ............... 166/276 |
| RE36,466 E | * 12/1999 | Nelson et al. | ............ 166/280.2 |

FOREIGN PATENT DOCUMENTS

| | | | |
|---|---|---|---|
| EP | 0 864 726 A2 | 9/1998 | ........... E21B/43/26 |
| EP | 1 130 215 A2 | 9/2001 | ........... E21B/43/26 |
| EP | 1 394 355 A1 | 3/2004 | ......... E21B/43/267 |
| EP | 1 403 466 A2 | 3/2004 | ......... E21B/43/267 |

OTHER PUBLICATIONS

"DOWANOL DPMA Global Product information" DOW chemical, undated.*
Foreign Search Report.

* cited by examiner

*Primary Examiner*—John Kreck
(74) *Attorney, Agent, or Firm*—Robert A. Kent; C. Clark Dougherty, Jr.

(57) ABSTRACT

Methods and compositions for preventing fracture proppant particle flowback from subterranean zones penetrated by well bores are provided. The methods basically comprise the following steps. One or more fractures are formed in a subterranean zone and proppant particles coated with a curable liquid composition for consolidating the proppant particles into resilient permeable masses are deposited in the fractures. The curable liquid composition is a mixture of a tackifying compound liquid and a curable resin. After the coated proppant particles have been deposited, the curable liquid composition is allowed to cure.

11 Claims, No Drawings

METHODS FOR PREVENTING FRACTURE PROPPANT FLOWBACK

BACKGROUND OF THE INVENTION

1. Field of the Invention

The present invention relates to improved methods and compositions for preventing proppant flowback from fractures.

2. Description of the Prior Art

Hydrocarbon producing wells are often stimulated by hydraulic fracturing treatments. In hydraulic fracturing treatments, a viscous fracturing fluid which also functions as a carrier fluid is pumped into a producing zone to be fractured at a rate and pressure such that one or more fractures are formed in the zone. Particulate solids, e.g., graded sand, for propping the fractures (commonly referred to in the art as "proppant particles") are suspended in a portion of the fracturing fluid so that the proppant particles are deposited in the fractures when the fracturing fluid is broken. That is, a delayed viscosity breaker is included in the fracturing fluid whereby the fracturing fluid reverts to a thin fluid which is returned to the surface. The proppant particles deposited in the fractures function to prevent the fractures from closing so that conductive channels are formed through which produced hydrocarbons can readily flow.

In order to prevent the subsequent flowback of proppant particles as well as formation sand and fines with fluids produced through the fractures, the proppant particles introduced into the fractures have heretofore been coated with a hardenable resin composition which is caused to harden and consolidate the proppant particles in the fractures. However, in high temperature wells, i.e., wells having subterranean temperatures greater than about 250° F., the hardened resin composition coating on the proppant particles deteriorates and proppant particle flowback occurs. The deterioration of the resin composition coated proppant particles also takes place in wells that do not have high temperatures, but are produced at very high rates. That is, high rate production flowing through the resin composition coated proppant particle packs also causes the proppant particle packs to deteriorate and proppant flowback to occur. In both types of wells where proppant flowback occurs, formation sand and fines flow through the deteriorating proppant particle packs with produced formation fluids. The flowback of the proppant particles and formation sand and fines with the produced formation fluids is very detrimental in that it erodes metal goods, plugs piping and vessels and causes damage to valves, instruments and other production equipment.

Thus, there are needs for improved methods and compositions for preventing fracture proppant particle flowback and the production of formation sand and fines with formation fluids in high temperature and/or high production wells.

SUMMARY OF THE INVENTION

The present invention provides improved methods and compositions for preventing fracture proppant particle flowback with formation sand and fines in high temperature and/or high production wells which meet the needs described above and overcome the deficiencies of the prior art. The methods of the invention are basically comprised of the following steps. One or more fractures are formed in a subterranean producing zone and proppant particles coated with a curable liquid composition for consolidating the proppant particles into resilient permeable masses in the fractures are deposited therein. The curable liquid composition is comprised of a mixture of a tackifying compound liquid and a curable resin. After being deposited in the fractures, the curable liquid composition on the proppant particles is allowed to cure and consolidate the proppant particles.

The consolidated proppant particle packs produced in accordance with this invention are highly resilient and do not deteriorate at high temperatures or at high production flow rates therethrough. The tackifying compound liquid in the curable liquid composition of this invention remains tacky which causes the proppant particles to adhere to each other in a packed position during the time period required for the curable resin to cure. Once cured, the resulting proppant particle pack is flexible and is able to withstand the effects of stress cycling as the well undergoes shut-in or is placed on production. The proppant particle pack also has sufficient consolidation strength to prevent deterioration when high rates of formation fluid production flow through the proppant particle pack. In addition, the curable resin in the curable liquid composition cures at high temperatures whereby the proppant particle pack has sufficient strength while remaining resilient and the cured resin does not deteriorate at high temperatures.

The objects, features and advantages of the present invention will be readily apparent to those skilled in the art upon a reading of the description of preferred embodiments which follows.

DESCRIPTION OF PREFERRED EMBODIMENTS

The methods and compositions of the present invention for preventing fracture proppant particle flowback from a subterranean zone penetrated by a well bore can be utilized in most wells where the proppant particles are subjected to fracture closure pressure. However, the methods and compositions of the present invention are particularly suitable for use in wells having high temperatures in the range of from about 200° F. to about 450° F. or in wells which are produced at high gas flow rates, e.g., flow rates in the range of from about 0.1 million to about 150 millions of standard cubic feet of gas per day.

Heretofore, fracture proppant particles have been coated with hardenable resin compositions or tackifying agents which consolidate the proppant particles into permeable packs. While the permeable packs have prevented or minimized proppant flowback with produced fluids having low temperatures and low production flow rates, when utilized in wells having high temperatures and/or high production rates, the consolidated packs rapidly deteriorate and proppant particle flowback occurs.

The methods of the present invention of preventing fracture proppant particle flowback from low temperature and low production rate subterranean zones as well as subterranean zones having the high temperatures and high production rates mentioned above are basically comprised of the following steps. One or more fractures are formed in a subterranean zone and proppant particles coated with a curable liquid composition for consolidating the proppant particles into resilient permeable masses are deposited in the fractures. The curable liquid composition coated on the proppant particles is comprised of a mixture of a tackifying compound liquid and a curable resin. The curable liquid composition is allowed to cure whereby resilient permeable proppant particle masses are formed in the fractures.

As mentioned above, the curable liquid composition of this invention for consolidating proppant particles into resilient permeable masses in fractures which exert closure pressure on the proppant particles is comprised of a mixture of a tackifying compound liquid and a curable resin. The tackifying compound liquid in the composition is a compound which when in liquid form or in a solvent solution forms a non-hardening tacky coating on the proppant particles. Examples of such tackifying compound liquids which can be utilized include, but are not limited to, liquid polyamides, polyamides in solvent solutions, liquid quaternized polyamides, quaternized polyamides in solvent solutions, liquid polyesters, polyesters in solvent solutions, liquid polycarbonates, polycarbonates in solvent solutions, liquid polycarbamates, polycarbamates in solvent solutions, and liquids or solvent solutions of polyacids, polyorganophosphates, polyphosphonates, polysulfates, polycarboxylates, polysilicates and esters thereof reacted with multivalent ions. Of these, a liquid or solvent solution of a polyamide is preferred with a polyamide dissolved in a dipropylene glycol methyl ether solvent being the most preferred.

The tackifying compound liquids and the tackifying compounds in solvent solutions that can be utilized in accordance with the present invention are further described in U.S. Pat. No. 5,775,425 issued to Weaver et al. on Jul. 7, 1998 which is incorporated herein by reference thereto.

Examples of curable resins which can be utilized in the curable liquid composition include, but are not limited to, phenolic resin, furan resin, phenolic formaldehyde resin, a mixture of phenolic and furan resin and epoxy resin. Of these, furan resin is preferred.

The tackifying compound liquid utilized is generally present in the curable liquid composition in an amount in the range of from about 60% to about 99% by weight of the composition, more preferably in an amount in the range of from about 70% to about 90% and most preferably about 80%. The curable resin utilized is generally present in the curable liquid composition in an amount in the range of from about 1% to about 40% by weight of the composition, more preferably in an amount in the range of from about 10% to about 30% and most preferably about 20%.

A curable liquid composition of this invention which is presently the most preferred is comprised of a tackifying compound liquid comprised of a polyamide dissolved in a dipropylene glycol methyl ether solvent present in an amount of about 80% and a furan resin present in an amount of about 20% by weight of the curable liquid composition.

When the proppant particles coated with the curable liquid composition of this invention are deposited in the fractures under closure pressure, the tackifying compound liquid in the composition remains tacky and causes the proppant particles to adhere to each other while the furan resin component of the curable liquid composition is cured by heat in the subterranean zone. As a result, the proppant particles are consolidated into resilient permeable masses in the fractures. Because the permeable masses are resilient they can withstand the effect of stress cycling and high production flow rates without the occurrence of proppant flowback. Also, the cured composition does not deteriorate and remains stable at temperatures up to about 450° F.

A preferred method of this invention for preventing fracture proppant particle flowback from a subterranean zone penetrated by a well bore is comprised of the steps of: (a) forming one or more fractures in the subterranean zone; (b) depositing proppant particles coated with a curable liquid composition for consolidating the proppant particles into resilient permeable masses in the fractures, the curable liquid composition comprising a mixture of a tackifying compound liquid or solution and a curable resin; and (c) allowing said curable liquid composition to cure.

Another preferred method of this invention for preventing fracture proppant particle flowback from a subterranean zone penetrated by a well bore is comprised of the steps of: (a) forming one or more fractures in the subterranean zone; (b) depositing proppant particles coated with a curable liquid composition for consolidating the proppant particles into resilient permeable masses in the fractures, the curable liquid composition comprising a mixture of a polyamide tackifying compound dissolved in dipropylene glycol methyl ether solvent and a phenolic resin; and (c) allowing the curable liquid composition to cure.

A preferred curable liquid composition of this invention for consolidating proppant particles into resilient permeable masses comprises a mixture of a tackifying compound liquid or solution and a curable resin.

In order to further illustrate the methods and compositions of this invention, the following examples are given.

EXAMPLE 1

A polyamide tackifying compound was dissolved in dipropylene glycol methyl ether solvent in an amount of 80% polyamide tackifying compound by weight of the solvent. A phenolic resin was then added to the solution in an amount of about 20% by weight of the solution. The curable liquid composition formed was then coated on 250 grams of 20/40 mesh bauxite proppant particles in an amount of about 3% by weight of the proppant particles. The resulting curable liquid composition coated proppant particles were then combined with an aqueous gelled liquid comprised of carboxymethyl guar and 2% (wt./vol.) ammonium chloride brine, the carboxymethyl guar being present in the solution in an amount of about 0.35% by weight of the solution.

The resin coated bauxite proppant was screened out of the aqueous gelled liquid as it was being packed into a brass cylinder chamber with an inside diameter of 1.38 inches. The resin treated proppant was then cured for 2 hours at a temperature of 325° F. in an oven. Thereafter, the consolidated proppant core was subjected to a water flow at a rate of about 12 liters per minute at a temperature of 120° F. for a time period of about 30 minutes. During that time a few proppant particles flowed out of the proppant pack with the water.

The above test was repeated except that the curable liquid composition coated bauxite proppant particles were cured for 20 hours at 325° F. before flowing water at 12 liters per minute through the core. No proppant particles from the core were produced with the water. Each of the cores tested had an estimated unconfined compressive strength of about 10 pounds per square inch.

During the water flow tests, the consolidated cores were observed to deform under stress without proppant particles being produced with the water.

EXAMPLE 2

Example 1 was repeated except that furan resin was substituted for phenolic resin. The consolidated proppant particle pack produced after 2 hours had an estimated unconfined compressive strength of about 5 pounds per square inch and no proppant particles were produced at a water flow rate of 6 liters per minute.

The proppant pack which was cured for 20 hours at 325° F. had an estimated consolidation strength of about 10 pounds per square inch and no proppant particles were produced at a water flow rate of 12 liters per minute.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of prevention fracture particle flowback from a subterranean zone penetrated by a well bore comprising the steps of:
   (a) forming one or more fractures in said subterranean zone;
   (b) depositing proppant particles coated with a curable liquid composition for consolidating said proppant particles into resilient permeable masses in said fractures, said curable liquid composition comprising a mixture of a tackifying compound liquid comprising a polyamide dissolved in a dipropylene glycol methyl ether solvent and a curable resin; and
   (c) allowing said curable liquid composition to cure.

2. The method of claim 1 wherein said tackifying compound liquid is present in said curable liquid composition in an amount in the range of from about 60% to about 99% by weight of said curable liquid composition.

3. The method of claim 1 wherein said curable resin is selected from the group consisting of phenolic resin, furan resin, phenolic formaldehyde resin, a phenolic and furan resin mixture and epoxy resin.

4. The method of claim 1 wherein said curable resin is furan resin.

5. The method of claim 1 wherein said curable resin is present in said curable liquid composition in an amount in the range of from about 1% to about 40% by weight of said curable liquid composition.

6. The method of claim 1 wherein said proppant particles are selected from the group consisting of graded sand, bauxite, ceramic materials, glass materials, walnut hulls and polymer beads.

7. The method of claim 1 wherein said proppant particles are graded sand.

8. A method of preventing fracture proppant particle flowback from a subterranean zone penetrated by a well bore comprising the steps of:
   (a) forming one or more fractures in said subterranean zone;
   (b) depositing proppant particles coated with a curable liquid composition for consolidating said proppant particles into resilient permeable masses in said fractures, said curable liquid composition comprising a mixture of a polyamide tackifying compound dissolved in dipropylene glycol methyl ether solvent and a furan resin; and
   (c) allowing said curable liquid composition to cure.

9. The method of claim 8 wherein said tackifying compound dissolved in said solvent is present in said mixture in an amount of about 80% by weight of said mixture.

10. The method of claim 8 wherein said furan resin is present in said mixture in an amount of about 20% by weight of said mixture.

11. The method of claim 8 wherein said proppant particles are graded sand.

* * * * *